(12) United States Patent
Pasquero et al.

(10) Patent No.: US 8,024,665 B2
(45) Date of Patent: Sep. 20, 2011

(54) METHOD AND APPARATUS FOR MODIFYING A SCHEDULING DATABASE

(75) Inventors: Jerome Pasquero, Kitchener (CA); Steven Fyke, Waterloo (CA); Michael Joseph DeFazio, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/722,248

(22) Filed: Mar. 11, 2010

(65) Prior Publication Data

US 2011/0041068 A1 Feb. 17, 2011

(30) Foreign Application Priority Data

Aug. 13, 2009 (EP) .................... 09167842

(51) Int. Cl.
*G06F 3/00* (2006.01)
(52) U.S. Cl. ........ 715/761; 715/728; 715/864; 715/963; 345/1.1; 345/2.1; 345/2.3; 709/217; 705/7.13; 705/7.18
(58) Field of Classification Search .................. 715/963; 345/1.1
See application file for complete search history.

(56) References Cited

U.S. PATENT DOCUMENTS

| | | | | |
|---|---|---|---|---|
| 6,466,236 | B1 * | 10/2002 | Pivowar et al. ............... | 715/835 |
| 2002/0090980 | A1 * | 7/2002 | Wilcox et al. ................ | 455/566 |
| 2005/0135393 | A1 * | 6/2005 | Benco et al. .................. | 370/408 |
| 2006/0221051 | A1 * | 10/2006 | Flynt et al. ................... | 345/156 |
| 2007/0143684 | A1 * | 6/2007 | Stillion et al. ................ | 715/733 |
| 2007/0271129 | A1 * | 11/2007 | Dutton et al. .................... | 705/8 |
| 2007/0271525 | A1 * | 11/2007 | Han et al. ....................... | 715/786 |
| 2008/0084860 | A1 | 4/2008 | Bloebaum et al. | |
| 2009/0030766 | A1 | 1/2009 | Denner et al. | |
| 2009/0066650 | A1 | 3/2009 | Bells et al. | |
| 2009/0094283 | A1 * | 4/2009 | Baudisch et al. .......... | 707/104.1 |

OTHER PUBLICATIONS

Engadget downloaded from http://www.engadget.com/2006/09/28/sony-ericsson-and-fossil-team-up-for-bluetoothwatch/, Aug. 13, 2009.
The Unwired Article downloaded from http://www.theunwired.net/?item=rip-microsoft-discontinues-spot-smartwatches-msn-direct-to-continue, Apr. 24, 2008.
European Examination Report, Dec. 3, 2009.
BigBoxStore.com downloaded from http://www.bigboxstore.com/w600-24k-gold-tri-band-waterproof-watch-smartphone.html.
Nike Amp—downloaded from http://www.productwiki.com/nike-amp/.
Zyonshop.com downloaded from http://www.zyonshop.com/product/pdawatch.htm.
How Stuff Works "How Smart Watches Work" downloaded from http://electronics.howstuftworks.com/gadgets/clocks-watches/smart-watch1.htm.

* cited by examiner

*Primary Examiner* — Alvin H Tan
(74) *Attorney, Agent, or Firm* — Perry + Currier (57) ABSTRACT

A mobile electronic communications device and a method for modifying a scheduling database are provided. The scheduling database is modified via the mobile electronic communications device in communication with a proximate electronic device comprising a display device, the mobile electronic communications device is engaging an oral communications session with a second communications device. Time slot data associated with an available time slot is retrieved from the scheduling database, via the mobile electronic communications device. The time slot data is transmitted to the proximate electronic device causing it to display the time slot data at the display device. Input data representative of a command to update the scheduling database is received at the mobile electronic communications device. An entry of the scheduling database is updated, via the mobile electronic device, based on the time slot data associated with the available time slot displayed at the display device.

20 Claims, 11 Drawing Sheets

METHOD AND APPARATUS FOR MODIFYING A SCHEDULING DATABASE

FIELD

The specification relates generally to databases, and specifically to a method and apparatus for modifying a scheduling database.

BACKGROUND

Scheduling an appointment in a calendar application on a mobile electronic communications device, such as a cellular telephone or personal digital assistant ("PDA"), is a useful and convenient method to maintain a schedule. However, using the mobile electronic communications device to schedule an appointment can be challenging when the device's display screen is not visible while the device is held proximate to a user's ear during an oral communications session. To schedule an appointment, the oral communications session is interrupted by taking the mobile electronic communications device away from the user's ear such that the available time slots displayed are visible. After seeing the available time slots, the user again puts the mobile electronic communications device proximate to his ear, for example to tell the party participating in the oral communications session, of the available time slots. If the available time slots are not suitable, the oral communications session is again interrupted as the device is again taken away from the user's ear to make display screen, and hence the available time slots, visible. The process continues until a suitable time slot is found.

The process of interrupting the oral communications session to search for an available time slot results in a waste of network resources. The network link facilitating the oral communications session idles when an oral communications session is interrupted while available time slots are searched. Furthermore, the network link is maintained for longer than necessary, while the available time slots are searched.

BRIEF DESCRIPTIONS OF THE DRAWINGS

Embodiments are described with reference to the following figures, in which.

DETAILED DESCRIPTION OF THE EMBODIMENTS

A first aspect of the specification provides a method for modifying a scheduling database via a mobile electronic communications device in communication with a proximate electronic device comprising a display device, when the mobile electronic communications device is engaging in an oral communications session with a second communications device. The method comprises retrieving, via the mobile electronic communications device, time slot data associated with an available time slot from the scheduling database. The method further comprises transmitting, via the mobile electronic communications device, the time slot data associated with the available time slot to the proximate electronic device to cause the proximate electronic device to display the time slot data associated with the available time slot at the display device. The method further comprises receiving input data at the mobile electronic communications device. The method further comprises, if the input data is representative of a command to update the scheduling database, updating, via the mobile electronic communications device, an entry of the scheduling database based on the time slot data associated with the available time slot displayed at the display device.

Retrieving, via the mobile electronic communications device, the time slot data associated with an available time slot from the scheduling database can comprise processing voice data received in the oral communications session and determining time slot data to retrieve based on the voice data.

The method can further comprise if the input data is representative of a command to send time slot data associated with a next available time slot, retrieving, via the mobile electronic communications device, the time slot data associated with the next available time slot from the scheduling database; and transmitting, via the mobile electronic communications device, the time slot data associated with the next available time slot to the proximate electronic device to cause the proximate electronic device to display the time slot data associated with the next available time slot at the display device.

The method can further comprise if the input data is representative of a command to send time slot data associated with a previous available time slot, retrieving, via the mobile electronic communications device, the time slot data associated with the previous available time slot from the scheduling database; and transmitting, via the mobile electronic communications device, the time slot data associated with the previous available time slot to the proximate electronic device to cause the proximate electronic device to display the time slot data associated with the previous available time slot at the display device.

The method can further comprise prior to the retrieving, receiving input data at the mobile electronic communications device to trigger the retrieving.

Receiving the input data at the mobile electronic communications device can comprise receiving the input data from the proximate electronics device, the input data generated at the proximate electronics device.

The input data can be generated via an accelerometer at, at least one of the proximate electronic device and the mobile electronic communications device.

Updating can comprise determining, via the mobile electronic communications device, an identifier associated with the second communications device; and updating, via the mobile electronic communications device, the entry with the identifier.

The mobile device can be wirelessly connected to the proximate electronic device. The mobile device can be wirelessly connected to the proximate electronic device via Bluetooth.

The proximate electronic device can comprise at least one of a wearable computing device, a bracelet, a shoe, a necklace, a watch, an appliance, a refrigerator, a microwave oven, an electronic device in an automobile, a cell phone, a personal computing device, an electronic device in an airplane, and a display in a public location.

A second aspect of the specification provides a mobile electronic communications device for modifying a scheduling database. The mobile electronic communications device comprises a processing unit interconnected with a communication interface and an input device, the communication interface configured to communicate with a proximate electronic device when the mobile electronic communications device is engaging in an oral communications session with a second communications device, the proximate electronic device comprising a display device. The processing unit can be configured to retrieve time slot data associated with an available time slot from a scheduling database. The processing unit can be further configured to transmit, via the communication interface, the time slot data associated with the available time slot to the proximate electronic device, to cause the proximate electronic device to display the time slot data associated with the available time slot at the display device. The processing unit can be further configured to if input data, received via the input device, is representative of a command to update the scheduling database, update an entry of the scheduling database based on the time slot data associated with the available time slot displayed at the display device.

To retrieve time slot data associated with an available time slot from a scheduling database the processing unit can be further configured to process voice data received in the oral communications session; and determine time slot data to retrieve based on the voice data.

The processing unit can be further configured to if the input data is representative of a command to send time slot data associated with a next available time slot, retrieve, via the input device, the time slot data associated with the next available time slot from the scheduling database; and transmit, via the communications interface, the time slot data associated with the next available time slot to the proximate electronic device to cause the proximate electronic device to display the time slot data associated with the next available time slot at the display device.

The processing unit can be further configured to if the input data is representative of a command to send time slot data associated with a previous available time slot, retrieve, via the input device, the time slot data associated with the previous available time slot from the scheduling database; and transmit, via the communications interface, the time slot data associated with the previous available time slot to the proximate electronic device to cause the proximate electronic device to display the time slot data associated with the previous available time slot at the display device.

The processing unit can be further configured to, prior to retrieving the time slot data, receive input data at the mobile electronic communications device to trigger the retrieving.

The mobile device can further comprise an accelerometer interconnected with the processing unit, the processing unit further configured to generate the input data, via the accelerometer.

To update the scheduling database, the processing unit can be further configured to determine an identifier associated with the second communications device; and update the entry with the identifier.

The communication interface can be configured to wirelessly connect, via the communications interface, to the proximate electronic device.

The communication interface can be configured to wirelessly connect, via the communications interface, to the proximate electronic device via Bluetooth.

A third aspect of the specification provides an electronic device comprising a processing unit interconnected with a communication interface, an input device and a display device, the communication interface configured to communicate with a second electronic device when the second electronic communications device is engaging in an oral communications session with a third communications device.

The processing unit configured to receive, via the communication interface, time slot data associated with an available time slot, from the second electronic device; and display, via the display device, the time slot data.

A fourth aspect of the specification provides a computer program product, comprising a computer usable medium having a computer readable program code adapted to be executed to implement a method for modifying a scheduling database via a mobile electronic communications device in communication with a proximate electronic device comprising a display device, when the mobile electronic communications device is engaging in an oral communications session with a second communications device.

The method can comprise retrieving, via the mobile electronic communications device, time slot data associated with an available time slot from the scheduling database.

The method can further comprise transmitting, via the mobile electronic communications device, the time slot data associated with the available time slot to the proximate electronic device to cause the proximate electronic device to display the time slot data associated with the available time slot at the display device.

The method can further comprise receiving input data at the mobile electronic communications device.

The method can further comprise if the input data is representative of a command to update the scheduling database, updating, via the mobile electronic communications device, an entry of the scheduling database based on the time slot data associated with the available time slot displayed at the display device.

Figure 1:
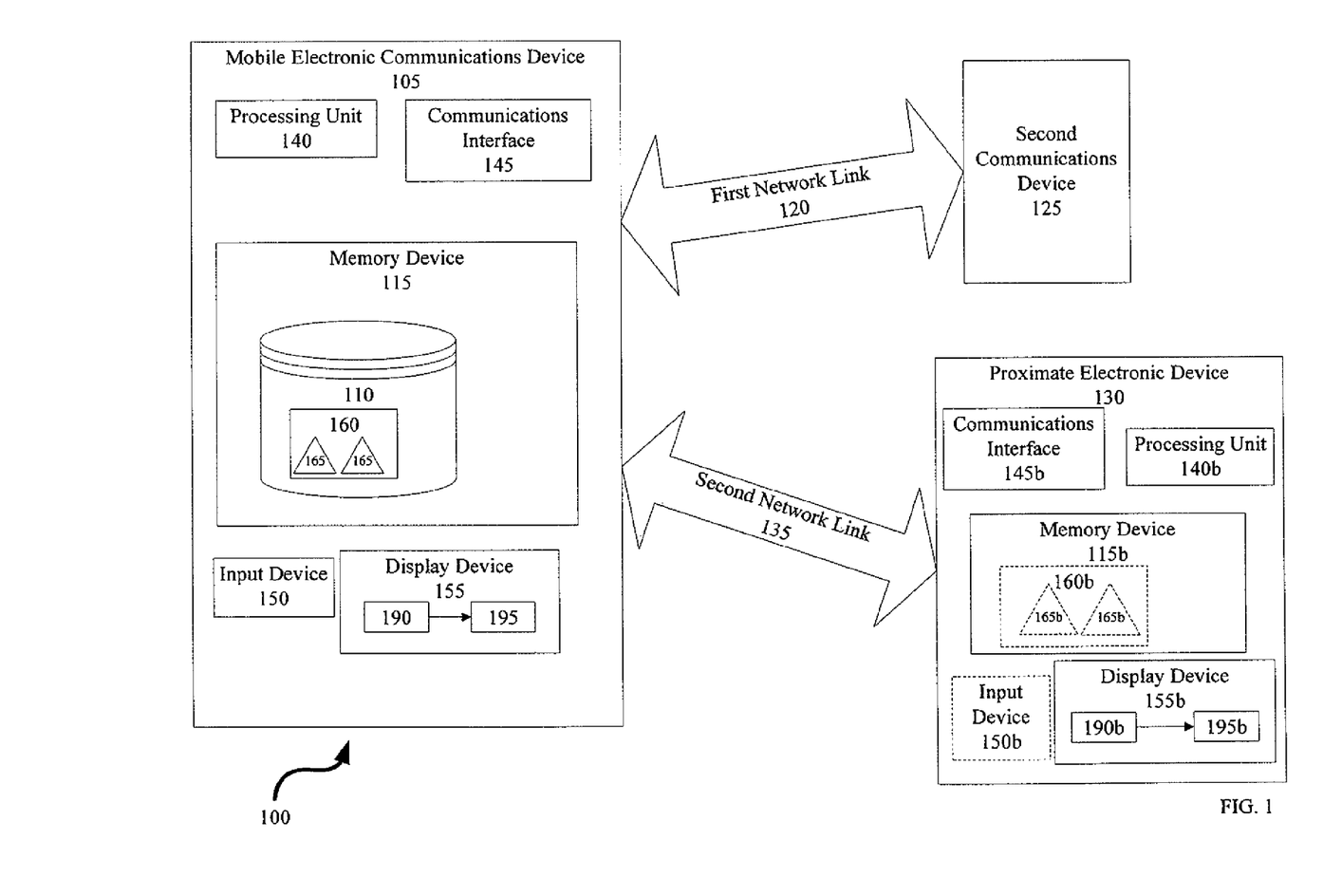
FIG. 1 depicts a system for modifying a scheduling database.

FIG. 1 depicts a system 100 for modifying a scheduling database 110, according to non-limiting embodiments. System 100 comprises: a mobile electronic communications device 105 for processing scheduling database 110 stored at a memory device 115; a mobile electronic communications device 105 in communication with a second communications device 125, via a first network link 120; and a mobile electronic communications device 105 in communication with a proximate electronic device 130, via a second network link 135.

Mobile electronic communications device 105 comprises a processing unit 140, a communications interface 145, memory device 115, input device 150, and display device 155, interconnected, for example, via a computing bus (not depicted). In other embodiments, input device 150 can be external to mobile electronic communications device 105, with mobile electronic communications device 105 in communication with input device 150.

Communications interface 145 generally enables communications device 105 to communicate with communications device 125 via first network link 120. Accordingly, communications interface 145 is enabled to communicate, according to any suitable protocol compatible with first network link 120. Furthermore, communications interface 145 is enabled to communicate in a wireless or wired manner, as desired, compatible with first network link 120, including but not limited to packet based protocols, Internet protocols, analog protocols, PSTN protocols, cell phone protocols (1X, UTMS, CDMA, GMS, and the like), WiFi protocols, WiMax protocols and/or a combination thereof. Other suitable protocols are within the scope of present embodiments.

First network link 120, can comprise any suitable combination of wired and/or wireless networks, including but not limited to packet based networks, the Internet, analog networks, the PSTN, LAN, WAN, cell phone networks, WiFi networks, WiMax networks and/or a combination thereof. Other suitable types of communications networks are within the scope of present embodiments.

Communications interface 145 further enables communications device 105 to communicate with proximate electronic device 130, via second network link 135. In some embodiments, second network link 135 is similar to first network link 120. However, in depicted embodiments, second network link 135 generally comprises a network or networks that have a shorter range than that of first network link 120 and/or the costs of the resources of second network link 135 is less expensive than that of first network link 120. For example, second network link 135 can include wireless personal area networks such as Bluetooth and ZigBee, and the like whereas first network link 120 can include wide area networks such as GSM, GPRS, CDMA or the like. However, it is understood any suitable protocol in either of first network link 120 and second network link 135 is within the scope of present embodiments.

Mobile electronic communications device 105 is generally enabled to process event data 160 stored at scheduling database 110. Event data 160 can be associated with events, meetings and the like. (In presently described exemplary embodiments, unless otherwise stated, the term "events" is understood to mean events, meetings and any other suitable occurrence which can be scheduled, and the like, and is not to be considered limiting.) Event data 160 comprises time slot data 165 associated with time slots in a schedule. A time slot can be classified as either available for scheduling an event or not available for scheduling an event. In non-limiting embodiments, each time slot data 165 comprises a start time and a duration (for example, 1 hour) or a start time and end time, the venue, and an indicator to indicate whether the time slot is available. The indicator can have a value of 1 to indicate the time slot is available and a value of 0 to indicate the time slot is not available, or any other suitable value, including but not limited to text describing an event occurring in the time slot. It is understood that the length of each time slot can be constant or variable, as desired. For example, in some embodiments, each time slot can have a duration of one hour, while in other embodiments, some time slots can have a duration of one hour while other time slots can have a duration of 15 minutes (or any other suitable length of time).

Figure 2:
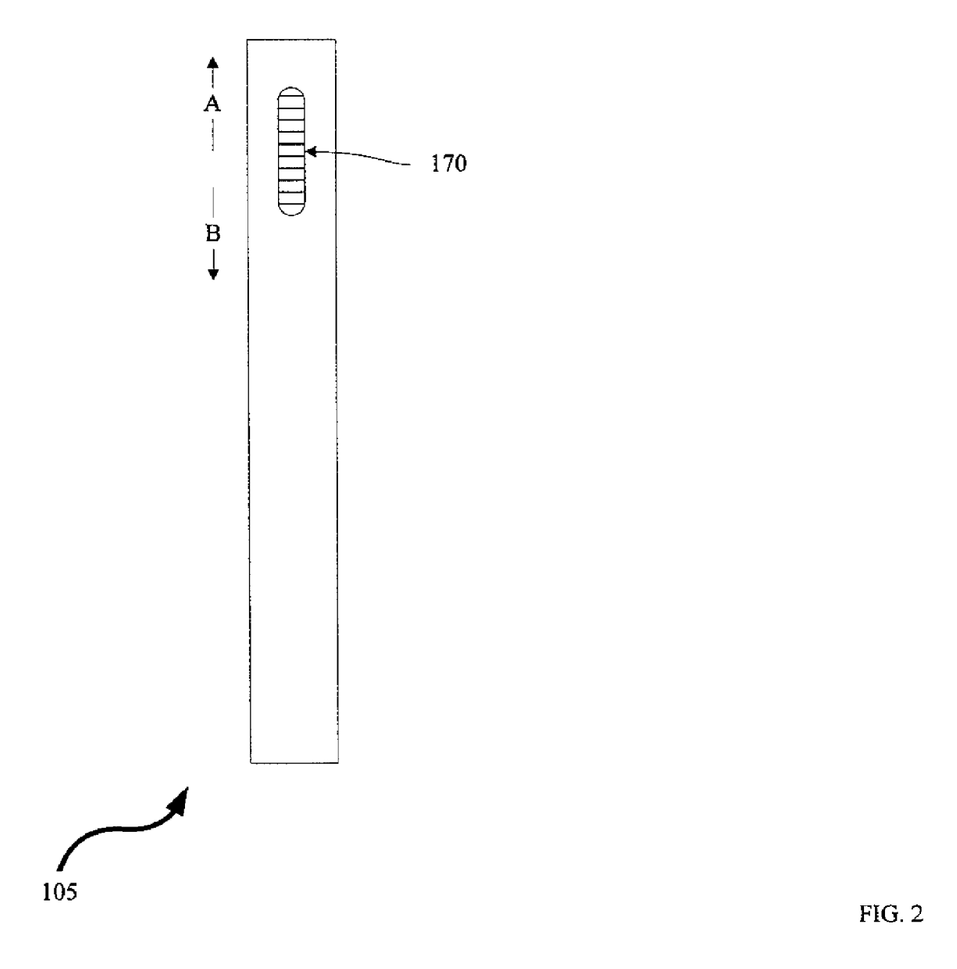
FIGS. 2 to 4 depict side views of a mobile electronic communications device of the system of FIG. 1, according to non-limiting embodiments.
Figure 3:
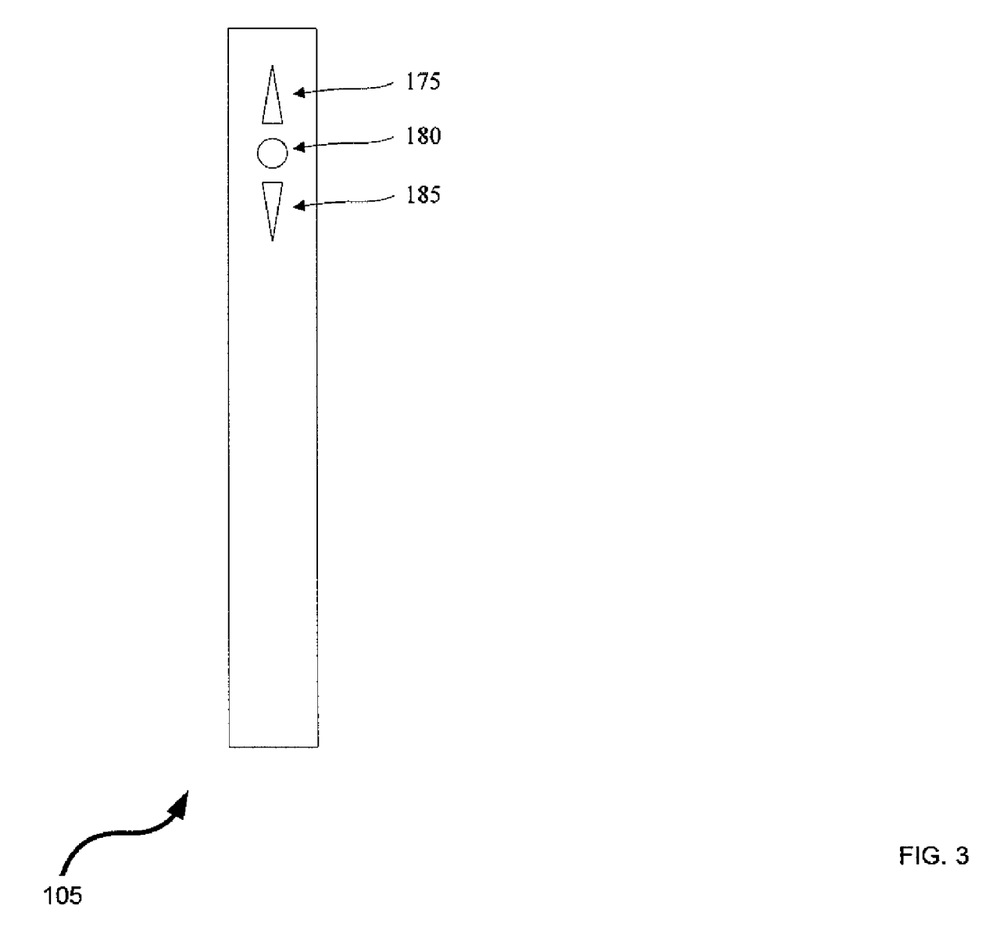
Figure 4:
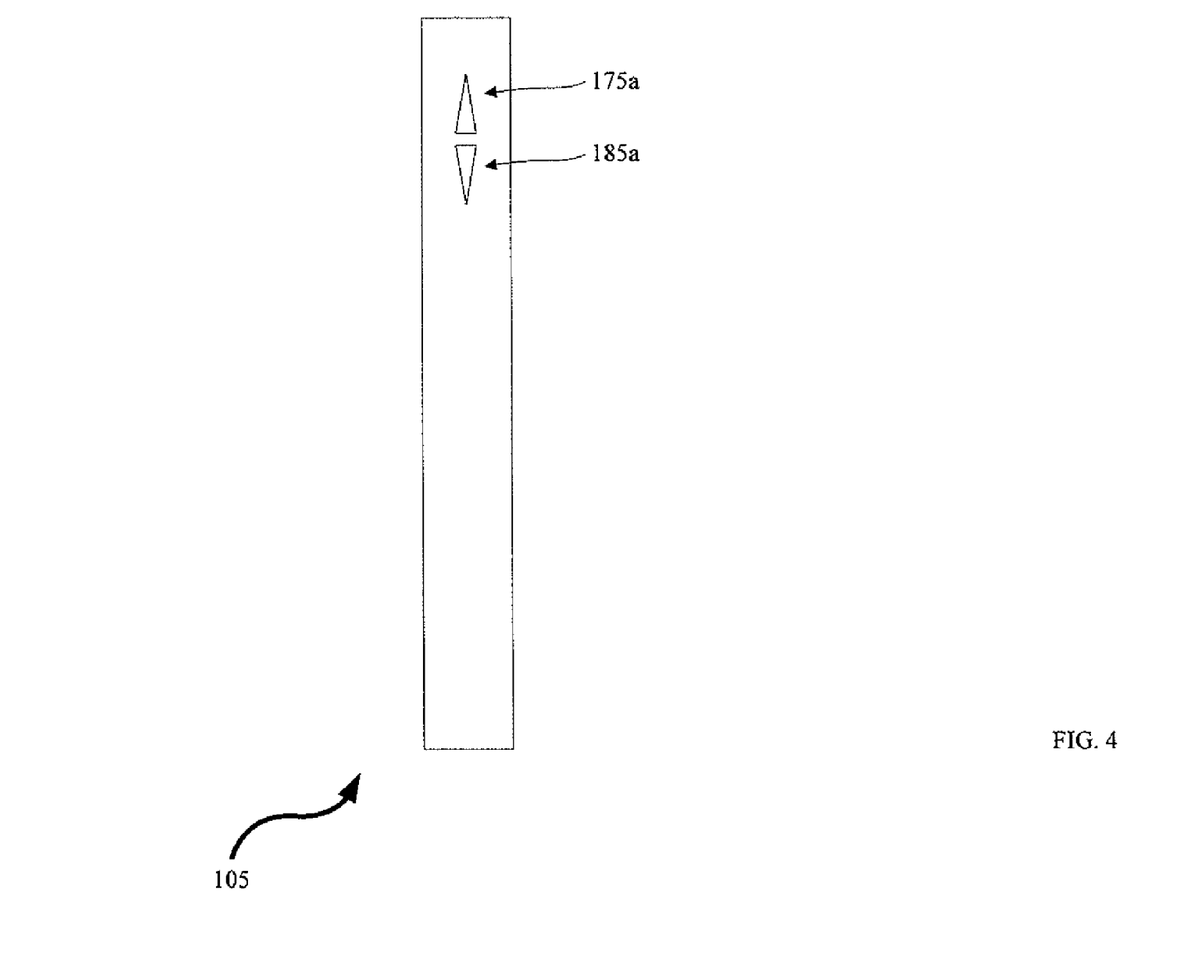

In some embodiments, input device 150 comprises a trackwheel 170 (as depicted in FIG. 2. which depicts a side view of mobile electronic communications device 105, according to non-limiting embodiments). Trackwheel 170 can be scrolled in a direction A or B and can also be depressed. The functionality of trackwheel 170 can be dependent on an application being processed by communications device 105 but generally, scrolling trackwheel 170 in direction A can have the opposite effect of scrolling trackwheel 170 in direction of B. Furthermore, depressing trackwheel 170 can have the effect of selecting an item. For example, to navigate a cursor from an item of a list to another item, scrolling trackwheel 170 in direction A can move the cursor to an item above the item where the cursor is located prior to scrolling trackwheel 170, scrolling trackwheel 170 in direction B can move the cursor to an item below the item where the cursor is located prior to scrolling trackwheel 170, and depressing trackwheel 170 selects the item where the cursor is located. In another embodiment, input device 150 comprises an up-button 175, a mid-button 180, and a down-button 185 (see FIG. 3). In yet other embodiments, input device 150 comprises up-button 175a and down-button 185a (see FIG. 4). Trackwheel 170 and buttons 175, 180, 185, 175a, 185a can be generally located on the side of mobile electronic communications device 105 at a location to facilitate their easy and speedy access while mobile electronic device 105 is being held in a position to facilitate oral communications without the use of the speakerphone.

Returning to FIG. 1, display device 155 comprises circuitry 190 for generating representation 195. Display device 155 can include any suitable combination of CRT and/or flat panel displays (e.g. LCD, plasma and the like), and circuitry 190 can include any suitable combination of circuitry for controlling the CRT and/or flat panel displays etc., including but not limited to display buffers, transistors, electron beam controllers, LCD cells, plasmas cells, phosphors etc. In particular, display device 155 and circuitry 190 can be controlled by processing unit 140 to generate representation 195.

Figure 7:
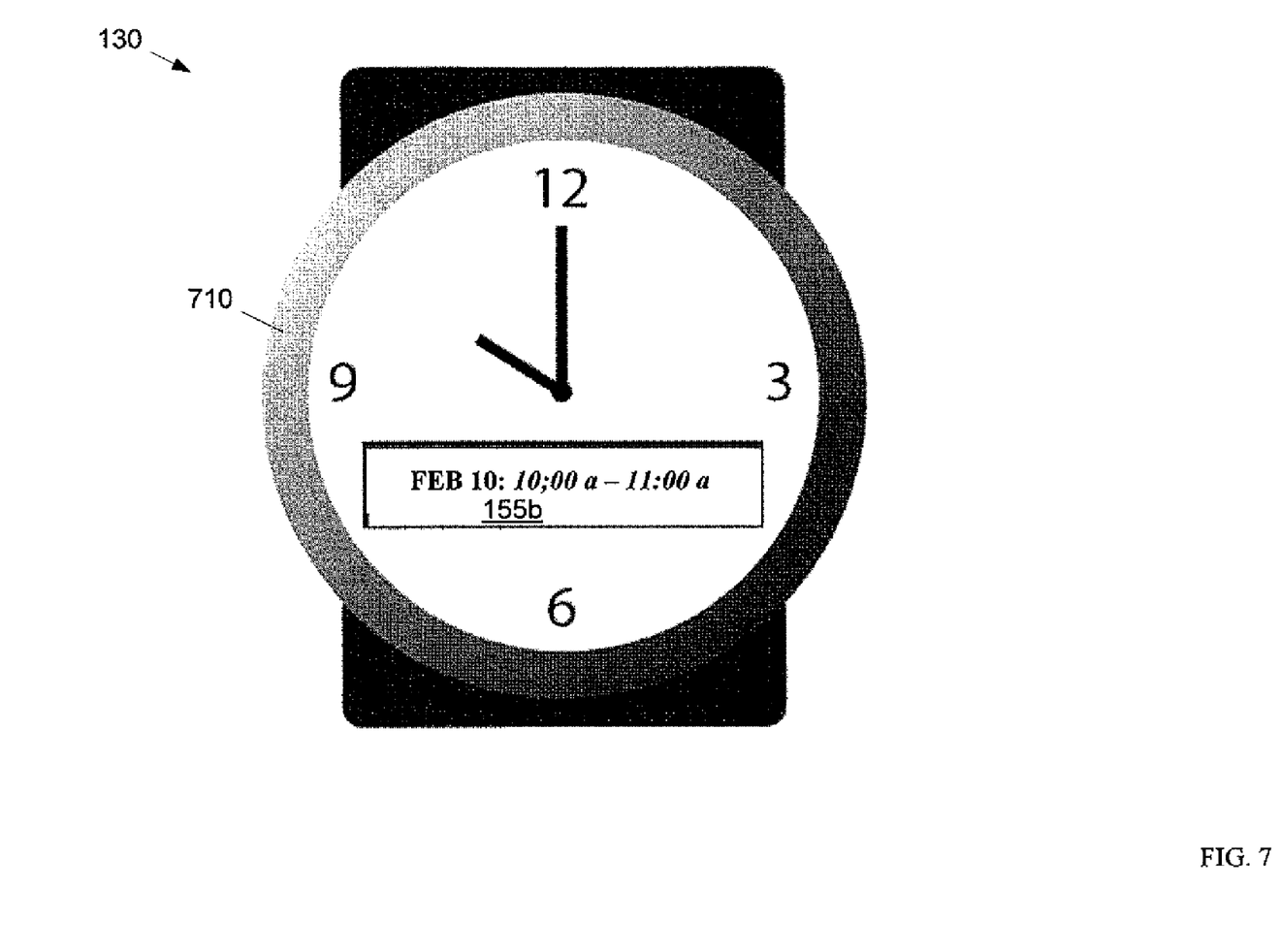
FIG. 7 depicts a front view of the proximate electronic device of the system of FIG. 1, according to non-limiting embodiments.

Proximate electronic device 130 comprises processing unit 140b, interface 145b, memory device 115b, and display device 155b. Each of processing unit 140b, interface 145b, memory device 115b, and display device 155b can be similar to respective processing unit 140, interface 145, memory device 115, and display device 155 of mobile electronic communications device 105. In some alternative embodiments, proximate electronic device 130 can comprise input device 150b. In non-limiting examples, input device 150b can comprise buttons, trackwheels, keys, and the like. It is understood that, in some embodiments, resources available to proximate electronic device 130 are generally limited when compared to those of mobile electronic communications device 105. For example, the capacity of memory device 115b can be less than that of memory device 115 and the processing power of processing unit 140b can be less than that of processing unit 140. It is understood, however, that proximate electronic device 130 can be any suitable type of electronic device comprising capabilities ranging from simple processing to advanced processing capabilities. Non-limiting examples of electronic devices comprising simple processing capabilities are wearable devices such as a watch (as shown in FIG. 7), a bracelet, a shoe, and a necklace. Non-limiting examples of electronic devices comprising advanced processing capabilities are the dashboard of an automobile, a cell phone, a personal computing device, a display in an airplane, and a display in a public location. In other embodiments, proximate electronic device 130 may be located in a home appliance, such as a refrigerator or microwave oven.

It is further understood that for the purpose of facilitating the modification of the scheduling database 110, most processing is performed by mobile electronic communications device 105. Hence, in some embodiments, proximate electronic device 130 is enabled to process commands issued by mobile electronic communications device 105. In some embodiments, the relationship between mobile electronic communications device 105 and proximate electronic device 130 is similar to that of a master to a slave. For example, mobile electronic communications device 105 can transmit commands and data to proximate electronic device 130, via second network link 135, to cause proximate electronic device 130 to display the data at display device 155b. In other embodiments, mobile electronic communications device 105 can transmit update commands to proximate electronic device 130 to cause proximate electronic device 130 to update display device 155b. In further embodiments, device memory 115b of proximate electronic device 130 can comprise a partial list of time slots data 165b, stored in event data 160b, which can be provisioned, for example, during a synchronization process, as described below. In these embodiments, bandwidth consumed in second network link 135 can be reduced since mobile electronic communications device 105 can send commands and a reference identifier associated with each time slot (rather than time slot data 165) to proximate electronic device 130. Mobile electronic communications device 105 can, periodically, send a partial list of time slot data 165 to proximate electronic device 130 to update memory device 115b of proximate electronic device 130 in a synchronization process.

Communications device 125 can comprise any device enabled to communicate with a wireless or wired network, and the like, such as a cellular phone, telephone, and the like.

Figure 5:
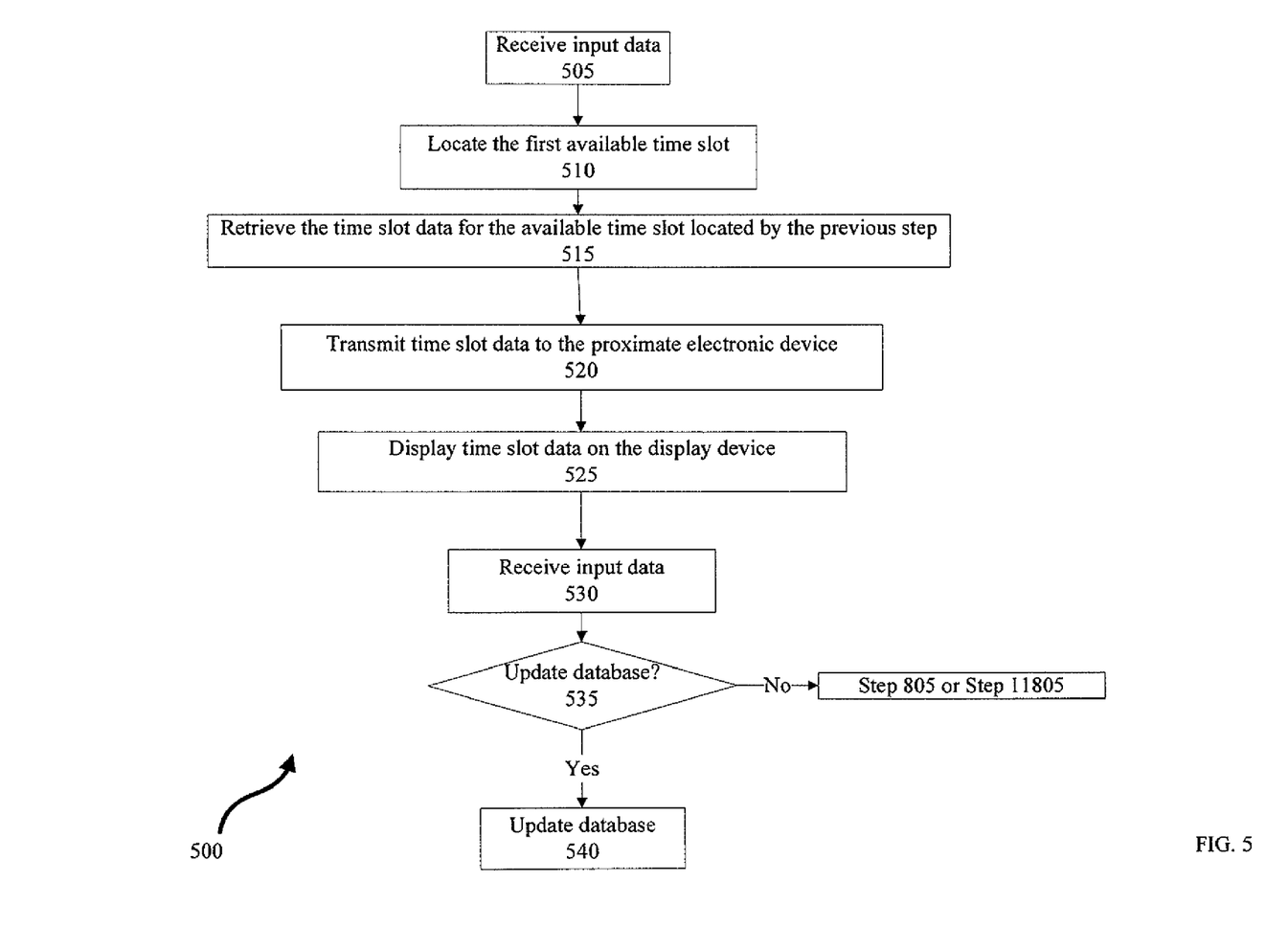
FIG. 5 depicts a block diagram of a method for modifying a scheduling database, according to non-limiting embodiments.

FIG. 5 depicts a method 500 of modifying a scheduling database via a mobile electronic communications device. To assist in the explanation of method 500, it will be assumed that method 500 is performed using system 100. Specifically, it is assumed method 500 is performed using mobile electronic communications device 105 storing scheduling database 110 at memory device 115, and that mobile electronic communications device 105 is enabled to control display device 155. Furthermore, the following discussion of method 500 will lead to a further understanding of system 100 and its various components. However, it is to be understood that system 100 or method 500 or both can be varied, and need not work exactly as discussed herein in conjunction with each other, and that such variations are within the scope of present embodiments. For example, in other embodiments, scheduling database 110 can be stored remotely from mobile electronic communications device 105, accessible via a suitable network link (such as network links 120, 130).

Furthermore, in the following discussion it is understood that mobile electronic communications device 105 is in communication with proximate electronic device 130, when mobile electronic communications device 105 is engaging in an oral communications session with communications device 125. For example, it is understood that an oral communications session has been established there between via first network link 120 and that voice data is being exchanged between mobile electronic communications device 105 and second communications device 125.

At step 505, mobile electronic communications device 105 receives input data to trigger the sending, via mobile electronic communications device 105, of the first available time slot data 165 to cause proximate electronic device 130 to display the first available time slot data 165 on display device 155b. In the present embodiment, the input data can be entered into mobile electronic communications device 105 through the use of trackwheel 170. In other embodiments, the input data can be entered through the use of buttons 175, 180, 185, 175a, 185a and/or any other suitable input device.

Figure 6:
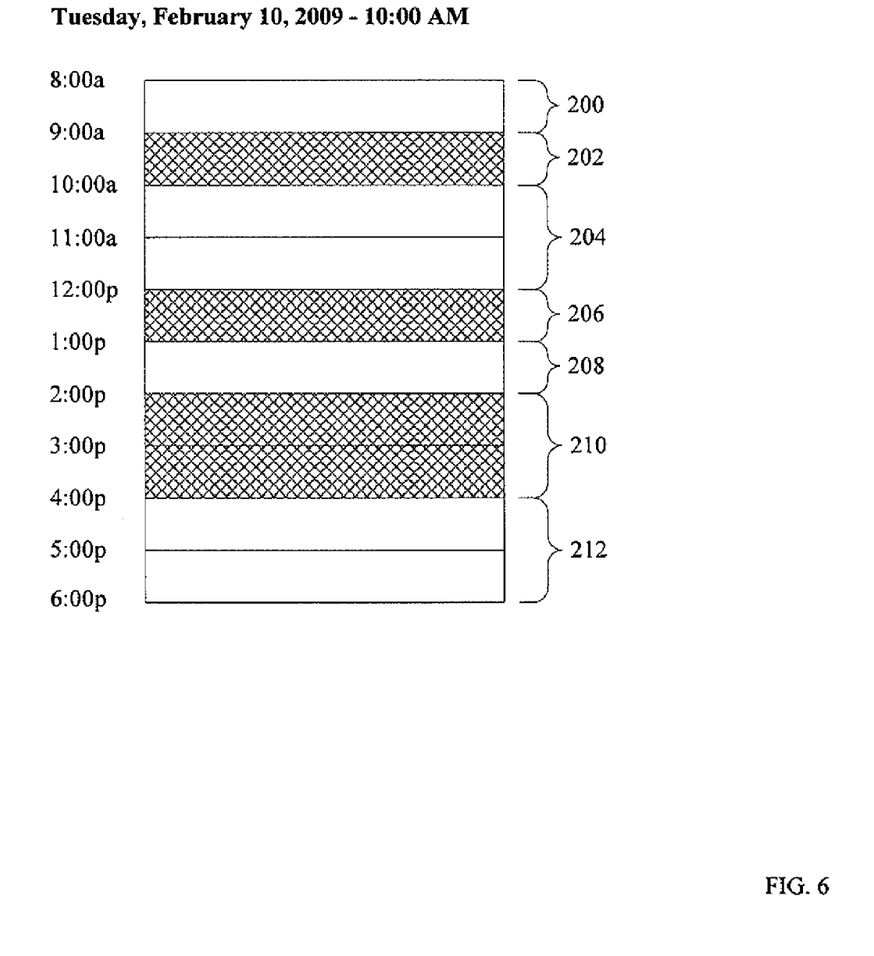
FIG. 6 depicts exemplary content of a scheduling database, according to non-limiting embodiments.

At step 510, processing unit 140 locates the first available time slot from scheduling database 110. In some embodiments, the first time slot can be the first time slot on or after the current date and/or time that is available for scheduling an event. In some embodiment, mobile electronic communications device 105 can further comprise a voice recognition application which determines that the voice data being exchanged between mobile electronic communications device 105 and second communications device 125 comprises data representative of a given date, for example "Tuesday February 10". Hence in these embodiments first available time slot data 165 on the given date is retrieved. In other embodiments, the first time slot can be the first time slot on or after a predefined date time that is available for scheduling an event. Attention is directed to FIG. 6, which depicts time slot data 165 in exemplary non-limiting embodiments. FIG. 6 depicts time slots 200, 204, 208, and 212 which are available for scheduling events and time slots 202, 206, and 210 which are not available for scheduling events. As described above, in some non-limiting embodiments, time slot data 165 comprises an indicator to indicate whether the time slot is available for scheduling an event. The indicator can have a value of 1 to indicate the time slot is available and a value of 0 to indicate the time slot is not available. In depicted embodiments, available time slots are indicated by being free of shading, while available time slots are indicated by being shaded. However, an unavailable time slot can further comprise event data (e.g. "Meeting with Bob" or any other suitable data). In the example from FIG. 6, for some embodiments, the first available time slot is time slot 200.

At step 515, time slot data 165 for the located available time slot is retrieved from scheduling database 110, via processing unit 140. Returning to FIG. 6, if the time slot located by the previous step is time slot 208 then the time slot data 165 for time slot 208 is retrieved from scheduling database 110. In some embodiments, the month, day, start time and end time are retrieved. Thus, using the example shown in FIG. 6, the data February 10, 1:00 p, and 2:00 p are retrieved for time slot 208.

At step 520, the time slot data 165 retrieved by the previous step is transmitted, from mobile electronic communications device 105, to proximate electronic device 130 via second network link 135 to cause proximate electronic device 130 to display the available time slot data 165 at display device 155b. For example, processing unit 140 can cause communications interface 145 to transmit the time slot data 165 to proximate electronic device 130, via second network link 135. In some embodiments, mobile electronic communications device 105 can transmit multiple available time slots at a time to proximate electronic device 130 rather than sending one at a time.

At step 525, proximate electronic device 130 displays the time slot data 165 on display device 155b. For example, processing unit 140b can cause circuitry 190b to generate representations 195b of the time slot data 165. Formatting can be determined by proximate electronic device 130 or mobile electronic communications device 105 or both. For example, in the embodiment depicted in FIG. 7, proximate electronic device 130 comprises a watch 710 and the viewable area on display device 155b is hence limited, the watch can format the time slot data 165 to fit display device 155b by displaying the short form of the month rather than the long form (i.e., "Feb" rather than "February"). In embodiments where mobile electronic communications device 105 determines the format, mobile electronic communications device 105 can transmit the time slot data 165 preformatted or transmit the formatting information with the time slot data 165.

At step 530, mobile electronic communications device 105 receives input data representative that at least one of the following is to occur: scheduling database 110 is to be updated, next available time slot is to be retrieved, and a previous available time slot is to be retrieved.

At step 535, processing unit 140 makes a determination whether the input data received in step 530 represents a command to update scheduling database 110.

If the determination at step 535 is that the input data received in step 530 is representative of a command to update scheduling database 110, at step 540, processing unit 140 updates an entry of scheduling database 110 based on the time slot associated with the time slot data 165 displayed at display device 155b to indicate that the time slot associated with the time slot data 165 displayed at display device 155b is not available for scheduling an event. In some embodiments, processing unit 140 can retrieve an identifier associated with second communications device 125 to update the entry of scheduling database 110 based on the time slot associated with the time slot data 165 displayed at display device 155b. A non-limiting example of an identifier associated with second communications device 125 can include, but is not limited to, an identifier of a user of second communication device 125, for example as stored as text data in memory device 115. Furthermore, mobile electronic communications device 105 can retrieve the identifier associated with second communication device 125 from data being exchanged between mobile electronic communications device 105 and second communications device 125 or from a contact list within mobile electronic communications device 105 containing the identifier associated with second communications device 125. In the embodiment depicted in FIG. 2, depression of trackwheel 170 results in receipt of input data that is indicative of a command to update scheduling database 110. In the embodiment depicted by FIG. 3, depression of mid-button 180 results in receipt of input data that is indicative of a command to update scheduling database 110. In the embodiment depicted by FIG. 4, simultaneously holding down (i.e., depressing for a suitable duration, for example 2 seconds) up-button 175a and down-button 185a results in receipt of input data that is indicative of a command to update scheduling database 110.

Figure 8:
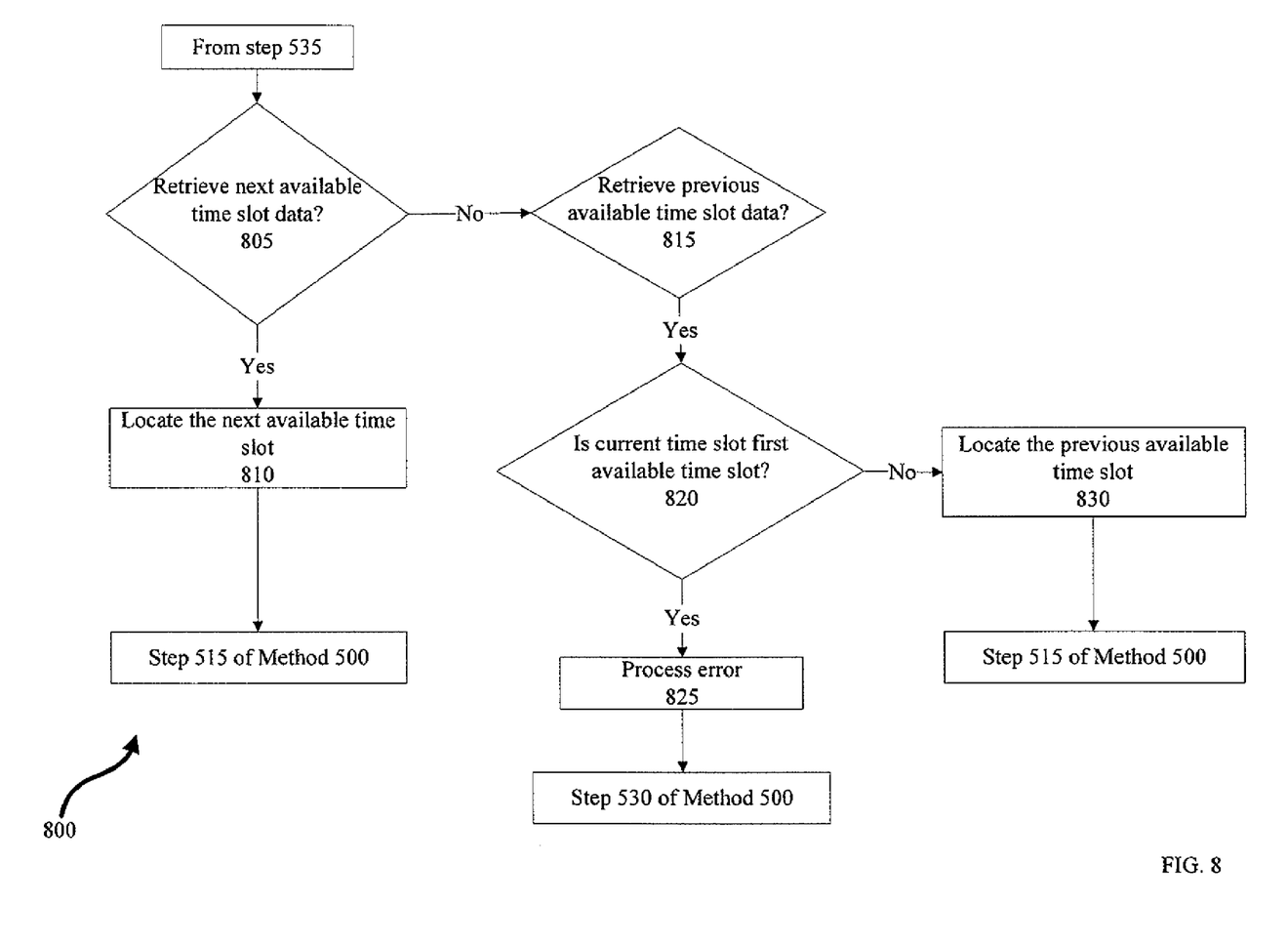
FIG. 8 depicts further steps of the method of FIG. 5, according to non-limiting embodiments.

FIG. 8 depicts a method 800 which is a continuation of method 500, described above. For example, as described below, if is determined at step 535 that the input data received in step 530 is not representative of a command to update scheduling database 110, at step 805 of FIG. 8, processing unit 140 determines whether the input data from step 530 is representative of a command to retrieve the next available time slot data 165.

If the determination at step 805 is that the input data received in step 530 is representative of a command to retrieve the next available time slot data 165, at step 810, processing unit 140 locates the next available time slot from scheduling database 110. For example, processing unit 140 locates the first available time slot after the time slot associated with time slot data 165 displayed at display device 155b. Again with reference to FIG. 6, if the slot displayed on display device 155b is time slot 200, the next available time slot is time slot 204 (i.e., February 10: 10:00 a-12:00 p). As described above, method 800 is a continuation of method 500. After locating the next available time slot data 165 at step 810, method 800 returns to step 515 of method 500. Step 515 and subsequent steps following step 515 are processed by processing unit 140 in substantially the same way as described above. In the embodiment depicted by FIG. 2, scrolling trackwheel 170 in direction B results in receipt of input data that is representative of a command to retrieve the next available time slot data 165. In the embodiment depicted by FIG. 3, depression of down-button 185 results in receipt of input data that is indicative of a command to retrieve the next available time slot data 165. In the embodiment depicted by FIG. 4, depression of down-button 185b results in receipt of input data that is indicative of a command to retrieve the next available time slot data 165.

If the determination at step 805 is that the input data received in step 530 is not representative of a command to retrieve the next available time slot data 165, at step 815, processing unit 140 determines whether the input data from step 530 is representative of a command to retrieve the previous available time slot data 165.

If the determination at step 815 is that the input data received in step 530 is representative of a command to retrieve the previous available time slot data 165, at step 820, processing unit 140 determines whether the time slot associated with time slot data 165 displayed at display device 155b is the first available time slot. In the embodiment depicted by FIG. 2, scrolling trackwheel 170 in direction A results in the receipt of input data that is indicative of a command to retrieve the previous available time slot data 165. In the embodiment depicted by FIG. 3, depression of up-button 175 results in the receipt of input data that is indicative of a command to retrieve the previous available time slot data. In the embodiment depicted by FIG. 4, depression of up-button 175b results in the receipt of input data that is indicative of a command to retrieve the previous available time slot data 165.

If the determination at step 820 is that the time slot associated with the time slot data 165 displayed at display device 155b is the first available time slot, at step 825, processing unit 140 can treat the input data received from step 530 as an error. For example, processing unit 140 can issue an error message in an audio form by causing a speaker (not shown) of mobile electronic device 105 and/or proximate electronic device 130 to "beep". Method 800 returns to step 530 of method 500. Step 530 and subsequent steps following step 530 are processed by processing unit 140 in substantially the same way as described above.

If the determination at step 820 is that the time slot associated with the time slot data 165 displayed at display device 155b is not the first available time slot, at step 830, the processing unit 140 locates the previous available time slot from scheduling database 110. For example, processing unit 140 locates the first available time slot before the time slot associated with time slot data 165 displayed at display device 155b. Returning to FIG. 6, if the slot displayed at display device 155b is time slot 204, the previous available time slot is time slot 200 (i.e., February 10: 8:00 a-9:00 a). After locating the previous available time slot data 165 at step 830, method 800 returns to step 515 of method 500. Step 515 and subsequent steps following step 515 are processed by processing unit 140 in substantially the same way as described above.

In embodiments where a partial list of time slots 165b is located at memory device 115b, the steps of methods 500 and 800 can differ from that described above. For example, at step 515, mobile electronic communications device 105 can retrieve an identifier of the time slot rather than the whole of time slot data 165 associated with the time slot, and at step 520, mobile electronic communications device 105 can transmit an identifier of the time slot rather than time slot data 165. Upon receiving a command to display time slot data 165 on display device 155b, proximate electronic device 130 retrieves, from device memory 115b, time slot data 165b associated with the identifier received from mobile electronic communications device 105 and displays time slot data 165b on display device 155b.

Figure 9:
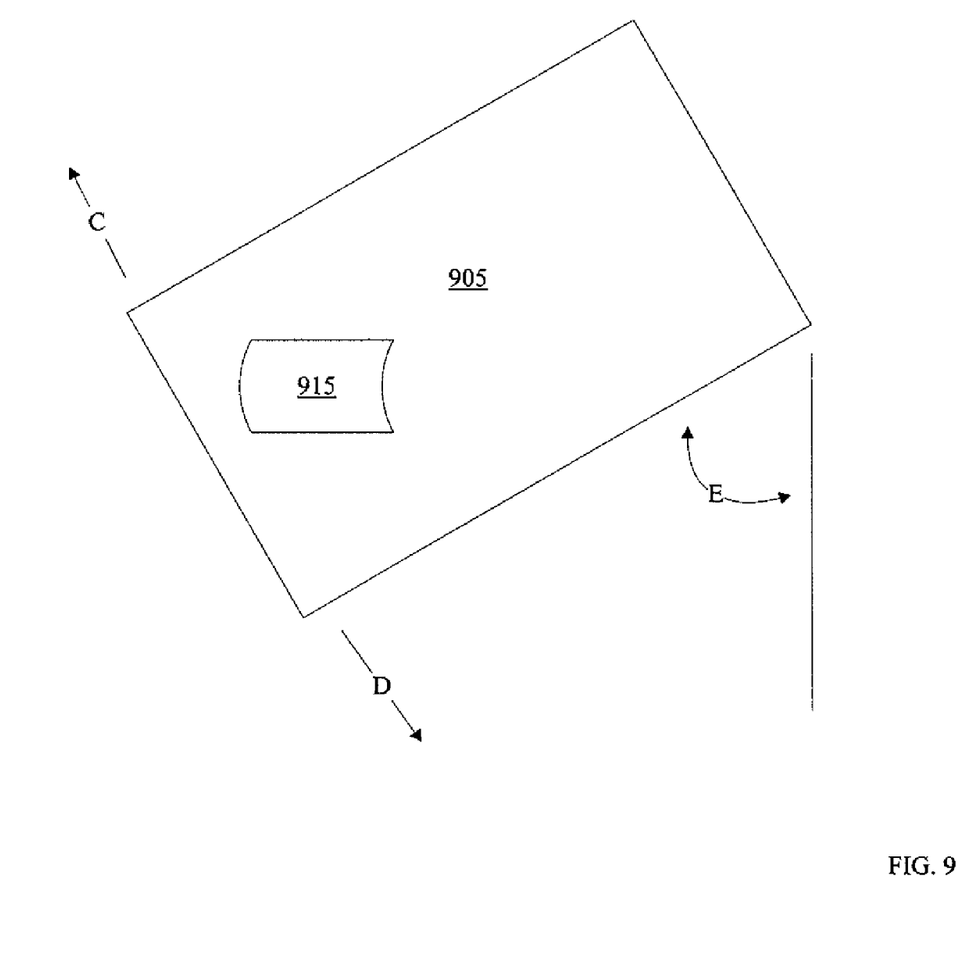
FIG. 9 depicts a front view of a mobile electronic communications device, according to another non-limiting embodiment.

Attention is now directed to FIG. 9, which depicts a device 905, according to non-limiting embodiments. While not all elements of device 905 are depicted, it is understood that device 905 is similar to device 105, and hence device 905 comprises a processing unit, a communications interface, a memory device, an input device and a display device. However device 905 further comprises an accelerometer 915, such that changing the angle of tilt E of device 905 results in accelerometer 915 generating an input representative of a change in the angle of tilt E of device 905. The input generated by changing the angle of tilt E of device 905 in an angular direction C can be used to instruct device 905 to locate the previous available time slot (see step 830 of FIG. 8). Likewise, the input generated by changing the angle of tilt E of device 905 in an angular direction D can be used to instruct device 905 to locate the next available time slot (see step 810 of FIG. 8).

Figure 10:
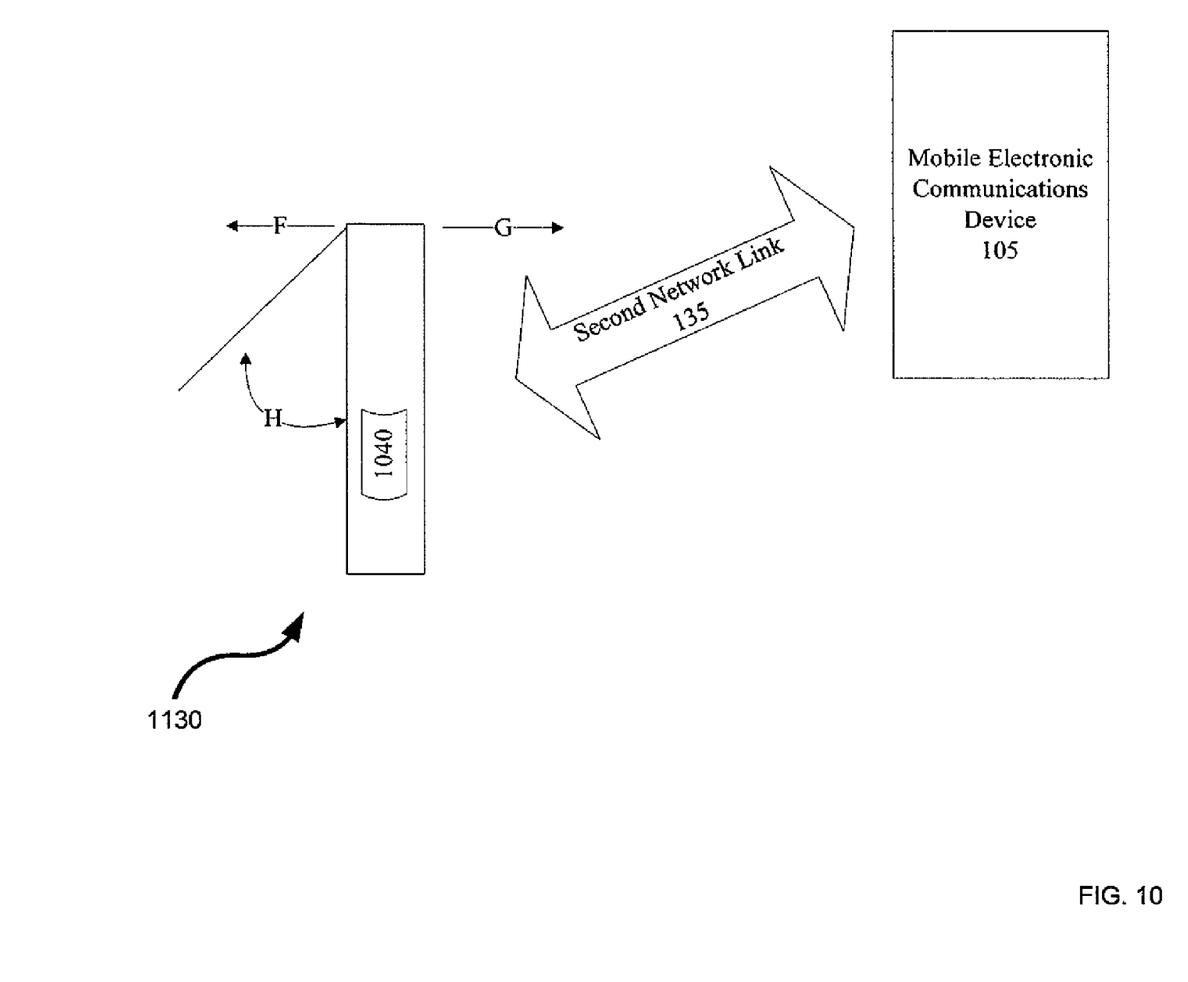
FIG. 10 depicts a side view of a proximate electronic device in communication with the mobile electronic communications device of the system of FIG. 1, according to another non-limiting embodiment.

Referring to FIG. 10, which depicts a side view of a proximate electronic device 1130 in communication with mobile electronic communications device 105, via second network link 135, according to non-limiting embodiments. It is understood that proximate electronic device 1130 is similar to proximate device 130 (see FIG. 1). However, proximate device 1130 further comprises an accelerometer 1040, such that changing the angle of tilt H of proximate electronic device 1130 results in accelerometer 1040 generating an input representative of a change in the angle of tilt H of proximate electronic device 1130. The input generated by changing the angle of tilt H of proximate electronic device 1130 in an angular direction F can be used to transmit a command, via second network link 135, to mobile electronic communications device 105 instructing mobile electronic communications device 105 to locate the next available time slot (see step 810 of FIG. 8). Likewise, the input generated by changing the angle of tilt H of proximate electronic device 1130 in an angular direction G can be used to transmit a command, via second network link 135, to mobile electronic communications device 105 to instruct mobile electronic communications device 105 to locate the previous available time slot (see step 830 of FIG. 8).

Figure 11:
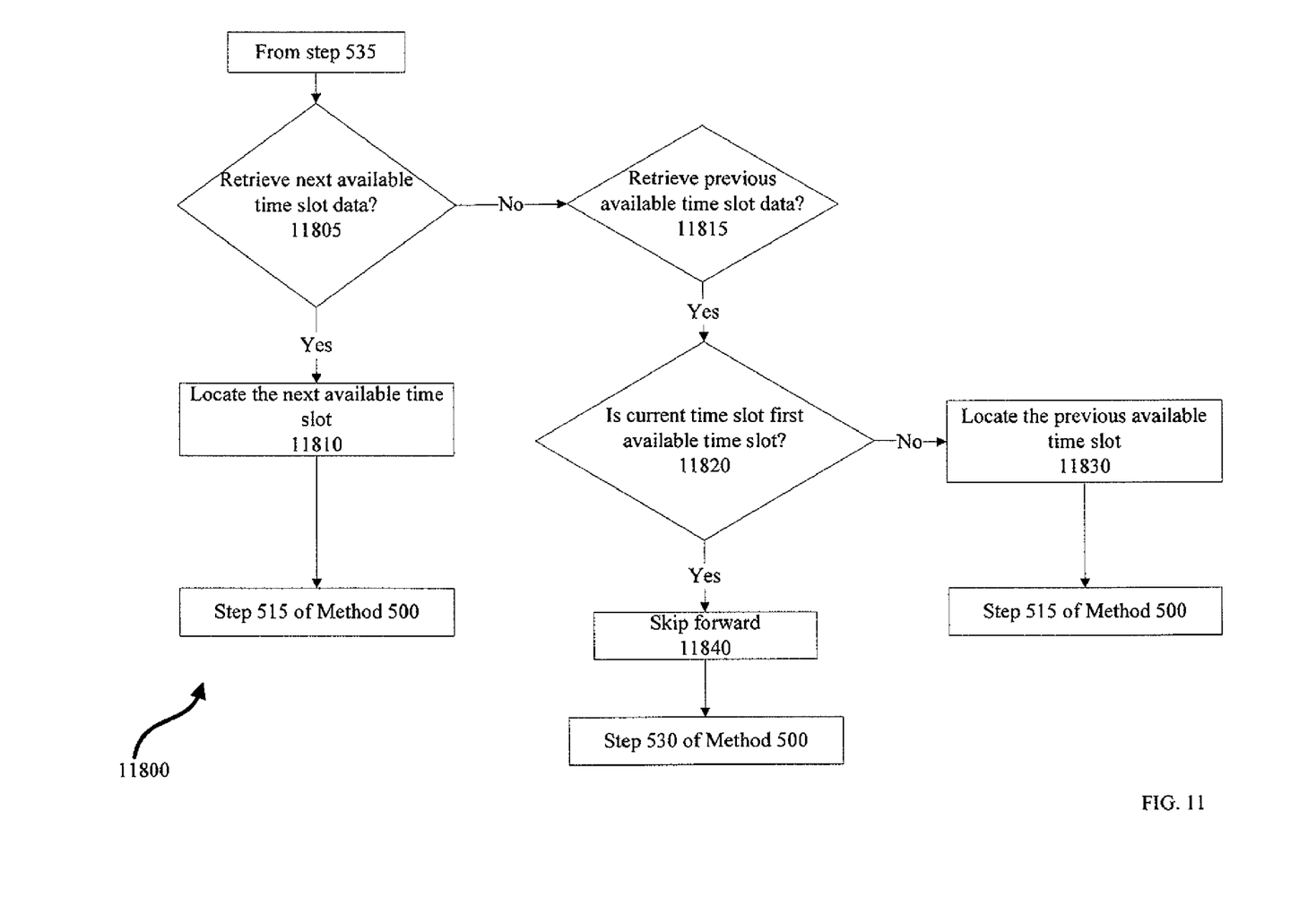
FIG. 11 depicts further steps of the method of FIG. 5, according to another non-limiting embodiment.

Referring to FIG. 11, which depicts a method 11800, according to a non-limiting embodiment. Method 11800 is a continuation of method 500 and is similar to method 800 of FIG. 8. Reference numeral of like steps of method 11800 and method 800 end in an identical three digit number (i.e., step 11805 is similar to step 805). Method 11800 replaces step 825 of method 800 with step 11840. At step 11840, processor unit 140 locates the first available time slot that is at least one predefined offset beyond (i.e., into the future) the start time of the time slot associated with time slot data 165 displayed at display device 155b. For example, if the predefined offset is one month and the start time of the time slot associated with time slot data 165 displayed at display device 155b is 8:00 am, Feb. 10, 2009, then at step 11840, processor unit 140 locates the first available time slot having a start time at or later than 8:00 am, Mar. 10, 2009 (e.g., 9:00 am Mar. 10, 2009). In some embodiments, after locating the time slot at step 11840, processor 140 may issue a notification in an audio form by causing a speaker (not shown) of mobile electronic device 105 and/or proximate electronic device 130 to "beep". The audio notification indicates that method 11800 has skipped forward into the future. It is understood that the value of the predefined offset can be set to any reasonable value such as one day, one week, etc. . . . Method 11800 returns to step 530 of method 500. Step 530 and subsequent steps following step 530 are processed by processing unit 140 in substantially the same way as described above.

Hence, present embodiments provide a method, system and apparatus for modifying a scheduling database via a mobile electronic communications device by displaying available time slot data on a proximate electronic device to enable the mobile electronic communications device to continue, without interruption, to exchange voice data with a second communications device during an oral communications session. The network link between the mobile electronic communications device and the second communications device does not need to be maintained for longer than necessary, while the available time slots are searched. The advantage of the method taught by the present application is readily evident in embodiments where the resources of the network link between the mobile electronic communications device and the second communications device is more costly than that of the network link between the mobile electronic communications device and the proximate electronic device. The network link between the mobile electronic communications device and the second communications device (i.e., the network link with the costlier resources) will not have to idle and wait during the search for a suitable available time slot to schedule an event.

Those skilled in the art will appreciate that in some embodiments, the functionality of devices 105, 125, and 130 can be implemented using pre-programmed hardware or firmware elements (e.g., application specific integrated circuits (ASICs), electrically erasable programmable read-only memories (EEPROMs), etc.), or other associated components. In other embodiments, the functionality of mobile electronic communications device 105 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:

1. A method for modifying a scheduling database via a mobile electronic communications device in communication with a proximate electronic device comprising a display device, when said mobile electronic communications device is engaging in an oral communications session with a second communications device, the method comprising:

retrieving, via said mobile electronic communications device, time slot data associated with a first available time slot from said scheduling database;

wirelessly transmitting, via said mobile electronic communications device, said time slot data associated with said first available time slot to said proximate electronic device to cause said proximate electronic device to display said time slot data associated with said first available time slot at said display device such that said time slot data is viewable at said proximate electronic device when said time slot data is not viewable at said mobile electronic communications device, wherein said time slot data is formatted by said proximate electronic device such that said time slot data displayed at said proximate electronic device is different from data displayed at said mobile electronic communications device during said oral communications session, wherein said retrieving step and said wirelessly transmitting step occur automatically in response to actuation of an input device at said mobile electronic communications device; and receiving input data at said mobile electronic communications device, and if said input data is representative of a command to update said scheduling database, updating, via said mobile electronic communications device, an entry of said scheduling database based on said time slot data associated with said first available time slot displayed at said display device.

2. The method of claim 1, wherein said retrieving, via said mobile electronic communications device, said time slot data associated with said first available time slot from said scheduling database comprises processing voice data received in said oral communications session and determining time slot data to retrieve based on said voice data.

3. The method of claim 1, further comprising:
if said input data is representative of a command to send time slot data associated with a next available time slot,
retrieving, via said mobile electronic communications device, said time slot data associated with said next available time slot from said scheduling database; and
transmitting, via said mobile electronic communications device, said time slot data associated with said next available time slot to said proximate electronic device to cause said proximate electronic device to display said time slot data associated with said next available time slot at said display device.

4. The method of claim 1, further comprising:
if said input data is representative of a command to send time slot data associated with a previous available time slot,
retrieving, via said mobile electronic communications device, said time slot data associated with said previous available time slot from said scheduling database; and
transmitting, via said mobile electronic communications device, said time slot data associated with said previous available time slot to said proximate electronic device to cause said proximate electronic device to display said time slot data associated with said previous available time slot at said display device.

5. The method of claim 1, further comprising, prior to said retrieving, receiving input data at said mobile electronic communications device to trigger said retrieving.

6. The method of claim 1, wherein said receiving said input data at said mobile electronic communications device comprises receiving said input data from said proximate electronic device, said input data generated at said proximate electronic device.

7. The method of claim 1, wherein said input data is generated via an accelerometer at, at least one of said proximate electronic device and said mobile electronic communications device.

8. The method of claim 1, wherein said updating comprises:
determining, via said mobile electronic communications device, an identifier associated with said second communications device; and
updating, via said mobile electronic communications device, said entry with said identifier.

9. The method of claim 1, wherein said mobile electronic communications device is wirelessly connected to said proximate electronic device via Bluetooth.

10. The method of claim 1, wherein said proximate electronic device comprises at least one of a wearable computing device, a bracelet, a shoe, a necklace, a watch, an appliance, a refrigerator, a microwave oven, an electronic device in an automobile, a cell phone, a personal computing device, an electronic device in an airplane, and a display in a public location.

11. A mobile electronic communications device for modifying a scheduling database comprising:
a processing unit interconnected with a communication interface and an input device, said communication interface configured to communicate with a proximate electronic device when said mobile electronic communications device is engaging in an oral communications session with a second communications device, said proximate electronic device comprising a display device, said processing unit configured to:
retrieve time slot data associated with a first available time slot from a scheduling database;
wirelessly transmit, via said communication interface, said time slot data associated with said first available time slot to said proximate electronic device, to cause said proximate electronic device to display said time slot data associated with said first available time slot at said display device, such that said time slot data is viewable at said proximate electronic device when said time slot data is not viewable at said mobile electronic communications device, wherein said time slot data is formatted by said proximate electronic device such that said time slot data displayed at said proximate electronic device is different from data displayed at said mobile electronic communications device during said oral communications session, wherein said retrieving step and said wirelessly transmitting step occur automatically in response to actuation of an input device at said mobile electronic communications device; and
if input data, received via said input device, is representative of a command to update said scheduling database, update an entry of said scheduling database based on said time slot data associated with said first available time slot displayed at said display device.

12. The mobile electronic communications device of claim 11, wherein to retrieve time slot data associated with said first available time slot from a scheduling database said processing unit is further configured to:
process voice data received in said oral communications session;
and determine time slot data to retrieve based on said voice data.

13. The mobile electronic communications device of claim 11, wherein said processing unit is further configured to:
if said input data is representative of a command to send time slot data associated with a next available time slot, retrieve, via said input device, said time slot data associated with said next available time slot from said scheduling database; and transmit, via said communications interface, said time slot data associated with said next available time slot to said proximate electronic device to cause said proximate electronic device to display said time slot data associated with said next available time slot at said display device.

14. The mobile electronic communications device of claim 11, wherein said processing unit is further configured to:
if said input data is representative of a command to send time slot data associated with a previous available time slot, retrieve, via said input device, said time slot data associated with said previous available time slot from said scheduling database; and
transmit, via said communications interface, said time slot data associated with said previous available time slot to said proximate electronic device to cause said proximate electronic device to display said time slot data associated with said previous available time slot at said display device.

15. The mobile electronic communications device of claim 11, wherein said processing unit is further configured to, prior to retrieving said time slot data, receive input data at said mobile electronic communications device to trigger said retrieving.

16. The mobile electronic communications device of claim 11, wherein said mobile device further comprising an accelerometer interconnected with said processing unit, said processing unit further configured to generate said input data, via said accelerometer.

17. The mobile electronic communications device of claim 11, wherein to update said scheduling database, said processing unit is further configured to:
determine an identifier associated with said second communications device; and
update said entry with said identifier.

18. The mobile electronic communications device of claim 11, wherein said communication interface is configured to wirelessly connect, via said communications interface, to said proximate electronic device via Bluetooth.

19. An electronic device comprising:
a processing unit interconnected with a communication interface,
an input device and a display device, said communication interface configured to communicate with a second electronic device when said second electronic communications device is engaging in an oral communications session with a third communications device, said processing unit configured to:
respond to an actuation of an input device at said second electronic communications device by causing said electronic device to wirelessly receive time slot data sent from said second electronics communications device and via said communication interface, said time slot data retrieved via said second electronics communications device, said time slot data associated with a first available time slot from a scheduling database; and
display, via said display device, said time slot data such that said time slot data is viewable at said electronic device when said time slot data is not viewable at said second electronic communications device, wherein said time slot data is formatted by said electronic device such that said time slot data displayed at said electronic device is different from data displayed at said second electronic communications device during said oral communications session.

20. A computer program product, comprising a computer readable storage medium having a computer readable program code adapted to be executed to implement a method for modifying a scheduling database via a mobile electronic communications device in communication with a proximate electronic device comprising a display device, when said mobile electronic communications device is engaging in an oral communications session with a second communications device, the method comprising:
retrieving, via said mobile electronic communications device, time slot data associated with a first available time slot from said scheduling database;
transmitting, via said mobile electronic communications device, said time slot data associated with said first available time slot to said proximate electronic device to cause said proximate electronic device to display said time slot data associated with said first available time slot at said display device, such that said time slot data is viewable at said proximate electronic device when said time slot data is not viewable at said mobile electronic communications device, wherein said time slot data is formatted by said proximate electronic device such that said time slot data displayed at said proximate electronic device is different from data displayed at said mobile electronic communications device during said oral communications session, wherein said retrieving step and said wirelessly transmitting step occur automatically in response actuation of an input device at said mobile electronic communications device; and
receiving input data at said mobile electronic communications device, and
if said input data is representative of a command to update said scheduling database,
updating, via said mobile electronic communications device, an entry of said scheduling database based on said time slot data associated with said first available time slot displayed at said display device.

* * * * *